(12) United States Patent
Chang (10) Patent No.: US 7,158,313 B2
(45) Date of Patent: Jan. 2, 2007

(54) ZOOM LENS

(75) Inventor: Yu-min Chang, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 0 days.

(21) Appl. No.: 11/439,473

(22) Filed: May 23, 2006

(65) Prior Publication Data

US 2006/0268425 A1    Nov. 30, 2006

(30) Foreign Application Priority Data

May 25, 2005 (TW) ............... 94117148 A (51) Int. Cl.
*G02B 15/14* (2006.01)
(52) U.S. Cl. ..................... 359/676; 359/687
(58) Field of Classification Search ......... 359/676–692
See application file for complete search history.

(56) References Cited

U.S. PATENT DOCUMENTS 6,721,105 B1 * 4/2004 Ohtake et al. .............. 359/676
7,068,440 B1 * 6/2006 Nakatani et al. ............ 359/676

* cited by examiner

*Primary Examiner*—Ricky Mack
*Assistant Examiner*—Mohammed Hasan (57) ABSTRACT

The present invention provides a miniature zoom lens having a first, a second, a third, a fourth, and a fifth lens group from object side to image side in order. The powers of those lens groups in same order are positive, negative, positive, positive, and positive. The first lens group for receiving light and the third lens group are fixedly positioned. The second lens group for zooming, the fourth lens group for compensating aberration and the fifth lens group for focusing are movably positioned. When the zoom lens is zoomed from wide status to telephoto status, the second lens group is moved toward the third lens group, the fourth lens group is moved close to the third lens group. The sensitivity of the zoom lens is determined by second lens group to simplify the adjusting and proofing procedures of other lens groups.

15 Claims, 10 Drawing Sheets

FIG. 1 spherical aberration

FIG. 2A distortion aberration

FIG. 2B astigmatic aberration

FIG. 2C

Chromatic difference of magnification

FIG. 2D spherical aberration

FIG. 3A distortion aberration

FIG. 3B astigmatic aberration

FIG. 3C

Chromatic difference of magnification

FIG. 3D spherical aberration

FIG. 4A distortion aberration

FIG. 4B astigmatic aberration

FIG. 4C

Chromatic difference of magnification

FIG. 4D coma aberration

FIG. 5A coma aberration

FIG. 5B coma aberration

FIG. 5C spherical aberration

FIG. 6A distortion aberration

FIG. 6B astigmatic aberration

FIG. 6C

Chromatic difference of magnification

FIG. 6D spherical aberration

FIG. 7A distortion aberration

FIG. 7B astigmatic aberration

FIG. 7C

Chromatic difference of magnification

FIG. 7D spherical aberration

FIG. 8A distortion aberration

FIG. 8B astigmatic aberration

FIG. 8C

Chromatic difference of magnification

FIG. 8D coma aberration

FIG. 9A coma aberration

FIG. 9B coma aberration

FIG. 9C

ZOOM LENS

FIELD OF THE INVENTION

The present invention generally relates to zoom lens, and more particularly to a miniature zoom lens with high zooming rate and high resolution.

BACKGROUND OF THE INVENTION

With an integration of the optical technology for photograph and the digital electronic technology recently, camera phones, small digital cameras or miniature home video cameras become available in the market for modern people's works or lives. Optical lens, which are the key components of this kind of production, not only have to be miniature and light, but also have to satisfy the demands for the high zooming rate and the high resolution. Generally, a lens system for those optical devices comprises multiple lens groups, a plurality of lens or longer length for possessing a high zooming rate. Meanwhile, the lens having high zooming rate will comprise a specific low chromatic dispersion lens and an aspherical lens to reach the demands for the resolution.

In a zoom lens, it will be necessary to appropriately construct the constitution of lens in each lens group to not just seek the miniaturization of the camera lens but to obtain the expecting zooming rate at the same time. If the powers of all lens groups are increased, the moving interval of each lenses group can be decreased during a zooming action for shortening the length of the whole camera lens. However, with the increase in the power of each lens group, a problem that the aberration fluctuates with a longer zoom and is difficult to correct properly may raise. Therefore, with regard to a miniature zoom lens, it is truly a dilemma of maintaining the high optical function of the zoom lens and simplifying the constitution of the optical system as possible to a designer of a zoom lens.

In this technique field, many resolutions of miniature zoom lenses have been disclosed, such as U.S. Pat. No. 5,185,678 of Minolta, issued in Feb. 9, 1993, and JP Patent No. 3044757 corresponding to the aforesaid US Patent. The Patent disclosed a zoom lens having five lens groups. These five lenses groups are first lens group with positive power, second lens group with negative power, third lens group with positive power, fourth lens group with positive power, and fifth lens group with positive power in order from the object side to the image side. Each lens group includes several single lenses or compound lenses. The whole camera lens includes about 16 to 20 pieces of optical lenses totally. Moreover, U.S. Pat. No. 6,061,186 of Canon, issued in May 9, 2000, also disclosed a zoom lens having five lens groups with positive power, negative power, positive power, positive power, and negative power in order respectively. The focal length of the zoom lens can be adjusted from a wide status to a telephoto status by changing respective intervals between lens groups. The lens groups of the zoom lens also include several single lenses or compound lenses. The whole camera lens includes about 17 to 19 pieces of optical lenses totally. The lenses employed in zoom lenses according to the prior arts are over 16 pieces. Except the increased cost of the camera lens, overweight of such zoom lenses is one of drawbacks either.

Consequently, there is a need to develop a light zoom lens, which is small, comparatively simplified, and still with excellent optical function.

SUMMARY OF THE INVENTION

To solve the foregoing drawbacks in the prior art, it is an objective of the present invention to provide a zoom lens having an optical system that is comparatively simplified, including less optical lenses to obtain a compact constitution, and providing a good optical imaging with high zooming rate and high resolution. Meanwhile, the sensitivity of the zoom lens is determined by at least one specific lens group to simplify the adjusting and proofing procedures of other lens groups.

To accomplish the above objective, the present invention provides a zoom lens comprising a first lens group, a second lens group, a third lens group, a fourth lens group, and a fifth lens group. The first lens group with positive power is fixed at a forefront to face to the object side for receiving light. The second lens group with negative power is movably positioned behind the first lens group for zooming. The second lens group comprises a first lens, a second lens with negative power, and a third lens with positive power. The second lens group comprises at least one aspherical lens. The third lens group with positive power is fixedly positioned behind the second lens group. The fourth lens group with positive power is movably positioned behind the third lens group. The fourth lens group comprises at least one aspherical lens. The fifth lens group with positive power is movably positioned behind the fourth lens group for focusing. When the zoom lens is zoomed from a wide status to a telephoto status, the second lens group will be moved toward the third lens group. The interval between the first lens group and the second lens group becomes increased. The fourth lens group will be moved close to the third lens group. The interval between the third lens group and the fourth lens group becomes decreased.

The zoom lens according to the present invention satisfies an equation as follows:

$$0.75 \leq \frac{2 \cdot f_W \cdot f_T}{Y \cdot L} \leq 1.35 \qquad (a-1)$$

The parameter $f_W$ is the focal length when the zoom lens is zoomed in a wide status, the parameter $f_T$ is the focal length when the zoom lens is zoomed in a telephoto status, Y is a maximum image height, L is a total length of the zoom lens from a first surface of the first optical lens closest to the object side to the image side.

According to the zoom lens of the present invention, the second and fourth lens groups satisfy an equation as follows:

$$2.3 \leq \left|\frac{f_4}{f_2}\right| \leq 3.9 \qquad (a-2)$$

The parameter $f_2$ is a focal length of the second lens group and the parameter $f_4$ is a focal length of the fourth lens group.

According to the present invention, the surface appearance of the aspherical lens of the zoom lens can be expressed by the following formula:

$$D = \frac{C \cdot H^2}{1 + \sqrt{1-(1+K) \cdot C^2 \cdot H^2}} + E_4 \cdot H^4 + E_6 \cdot H^6 + E_8 \cdot H^8 + E_{10} \cdot H^{10}$$

Comparing to the prior arts, the zoom lens of the present invention introduces a five lens group structure. The first lens group and the third lens group are fixed. The zoom lens zooms by moving the positions of the second lens group and the fourth lens group. Meanwhile, by adjusting the position of the fifth lens group, the zoom lens can be focused for obtaining a distinct image.

Furthermore, the sensitivity of the zoom lens according to the present invention is specifically determined by the second lens group to simplify the adjusting and proofing procedures of other lens groups. Accordingly, the zoom lens can provides high zooming rate and high resolution; moreover, the zoom lens can efficiently rectify the aberrations to obtain a good image quality. Comparatively, the whole camera lens includes only 12 pieces of optical lenses, which results in a compact constitution, a weight lightening and a cost down of a zoom lens.

BRIEF DESCRIPTION OF THE DRAWING

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Figure 1:
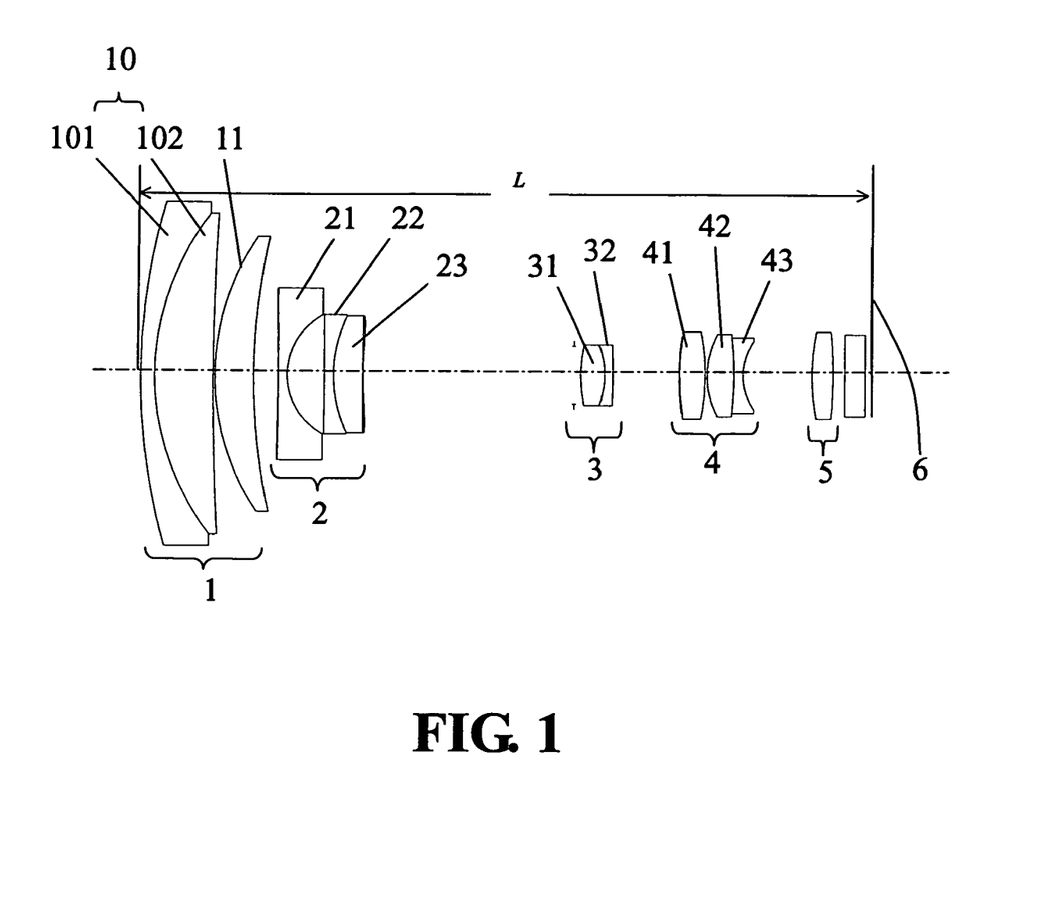
FIG. 1 shows an optical structural diagram of a zoom lens according to the present invention.
Figure 2A:
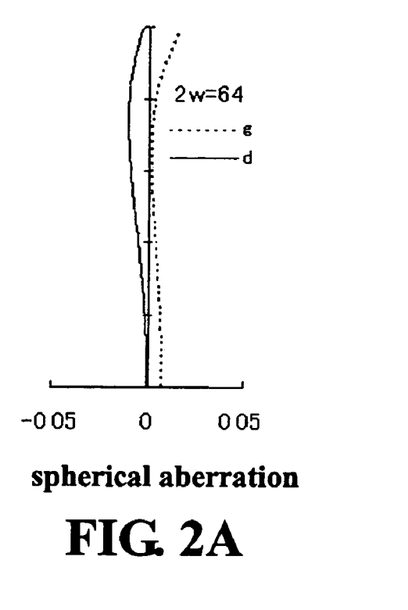
FIGS. 2A to 2D illustrates aberration curve diagrams of spherical aberration, distortion aberration, astigmatic aberration, and chromatic difference of magnification when a zoom lens is in a wide status in accordance with numerals of first embodiment according to the present invention.
Figure 2B:
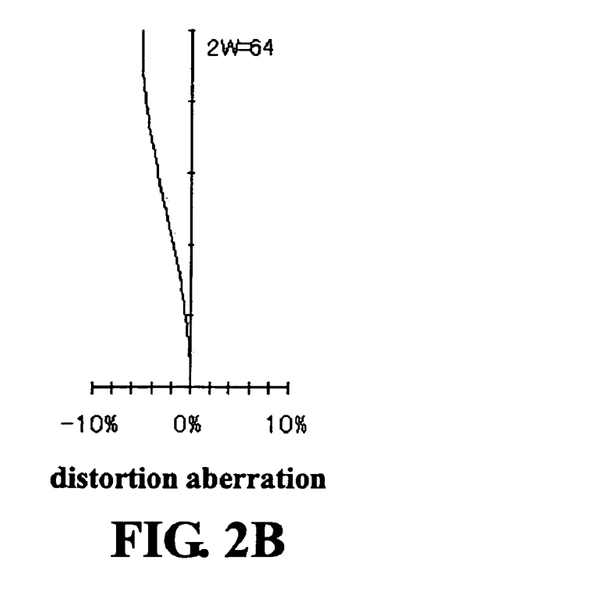
Figure 2C:
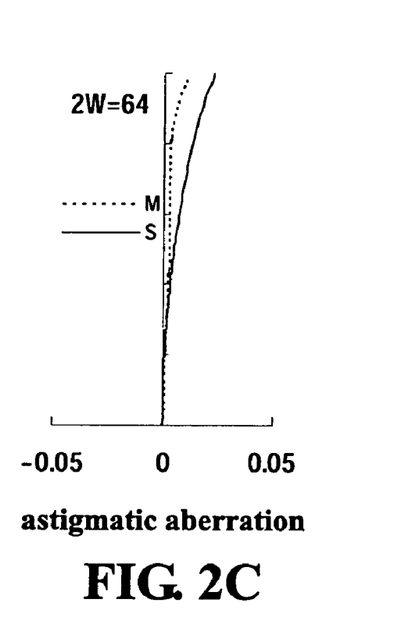
Figure 2D:
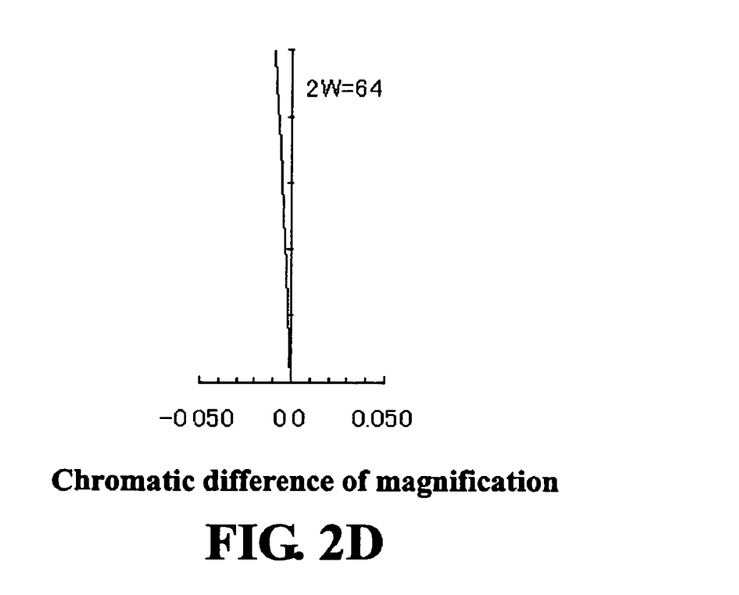
Figure 3A:
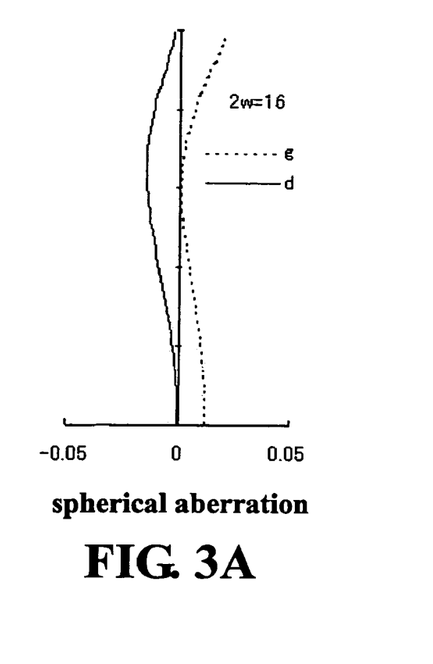
FIGS. 3A to 3D illustrates aberration curve diagrams of spherical aberration, distortion aberration, astigmatic aberration, and chromatic difference of magnification when a zoom lens is in a status between the wide status and a telephoto status in accordance with numerals of first embodiment according to the present invention.
Figure 3B:
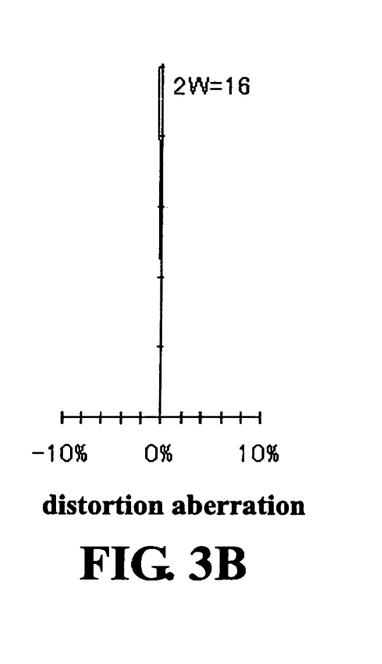
Figures 3C, 3D:
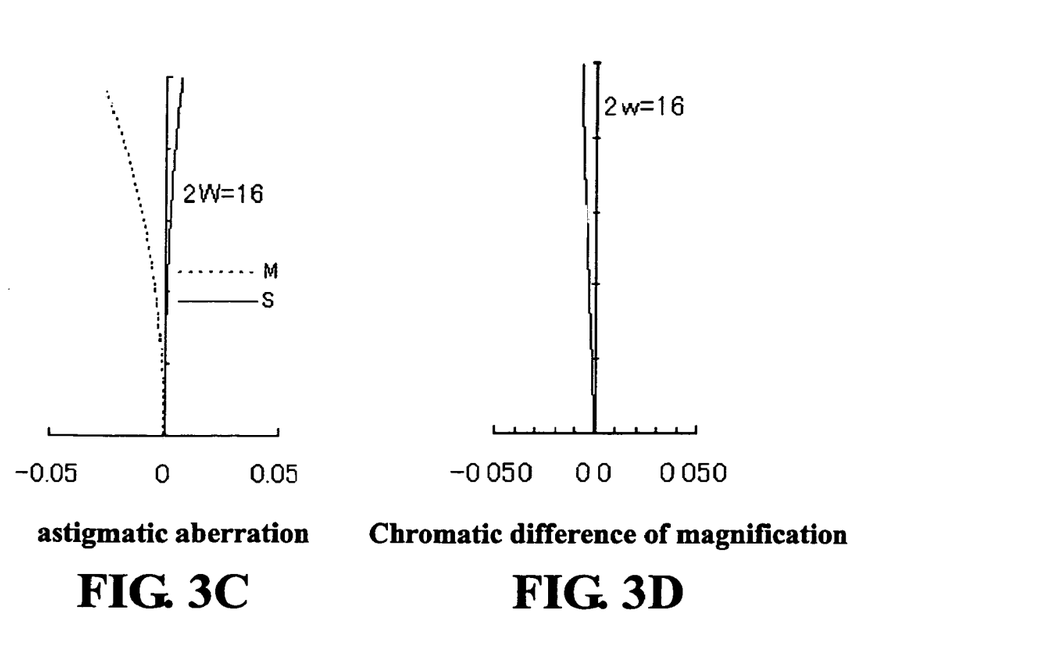
Figure 4A:
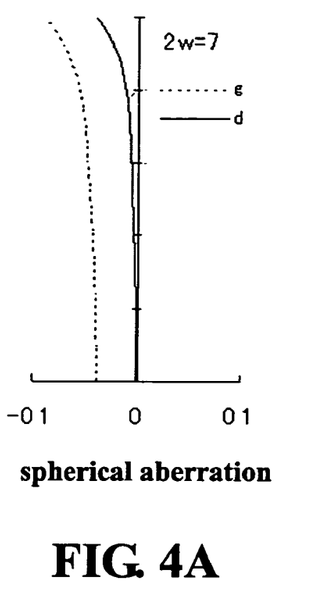
FIGS. 4A to 4D illustrates aberration curve diagrams of spherical aberration, distortion aberration, astigmatic aberration, and chromatic difference of magnification when a zoom lens is in a telephoto status in accordance with numerals of first embodiment according to the present invention.
Figure 4B:
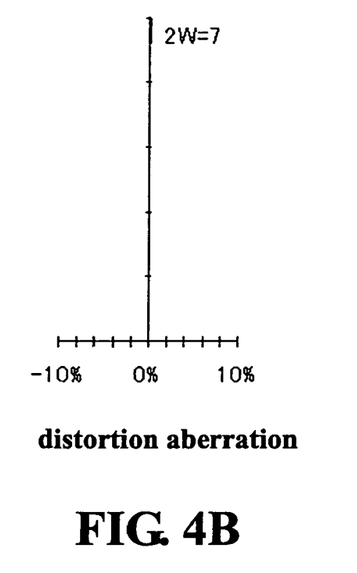
Figure 4C:
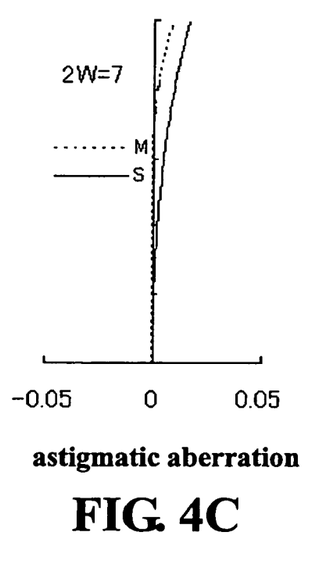
Figure 4D:
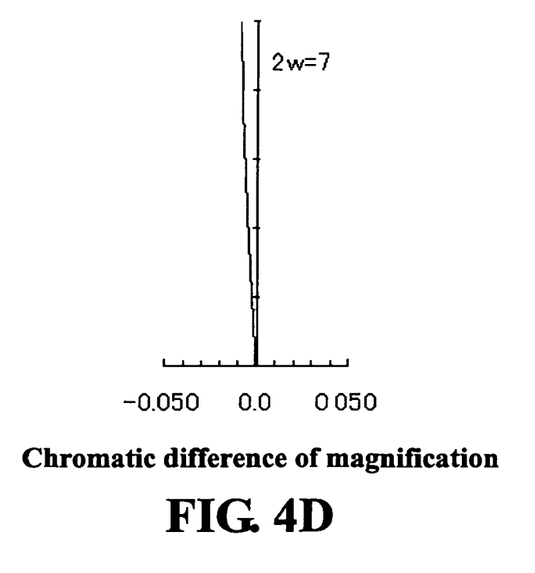
Figure 5A:
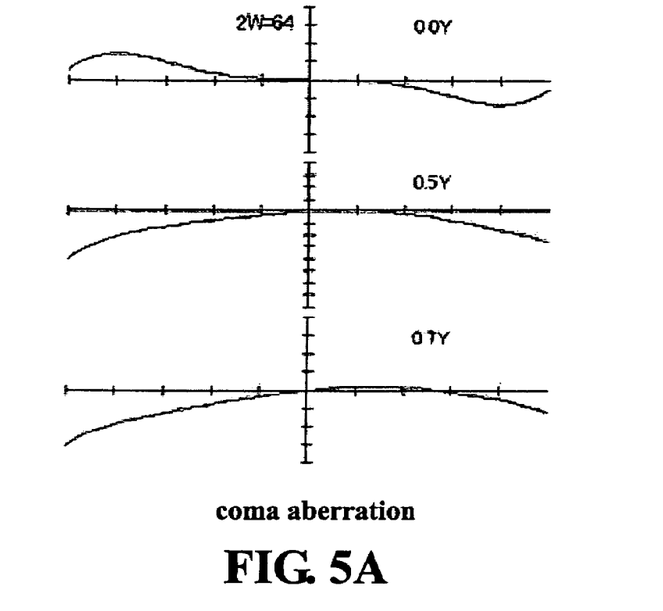
FIGS. 5A to 5C illustrates aberration curve diagrams of coma aberrations when a zoom lens is in the wide status, the in-between status, and the telephoto status in accordance with numerals of first embodiment according to the present invention.
Figure 5B:
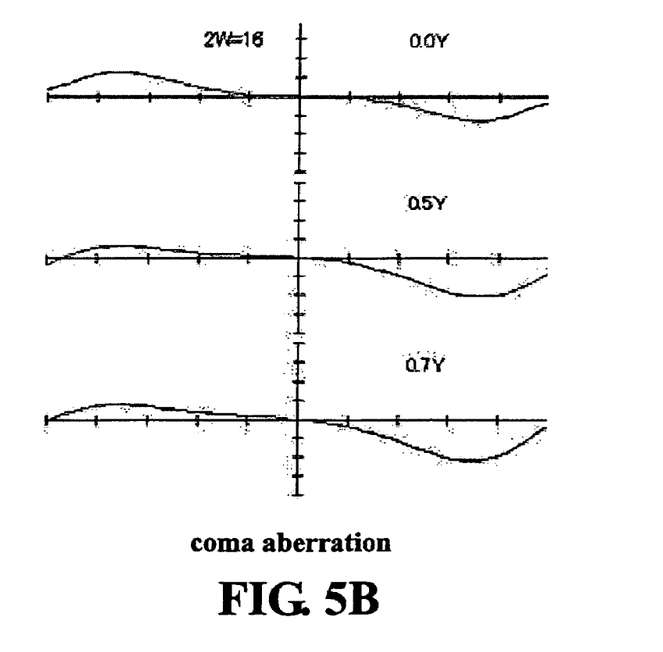
Figure 5C:
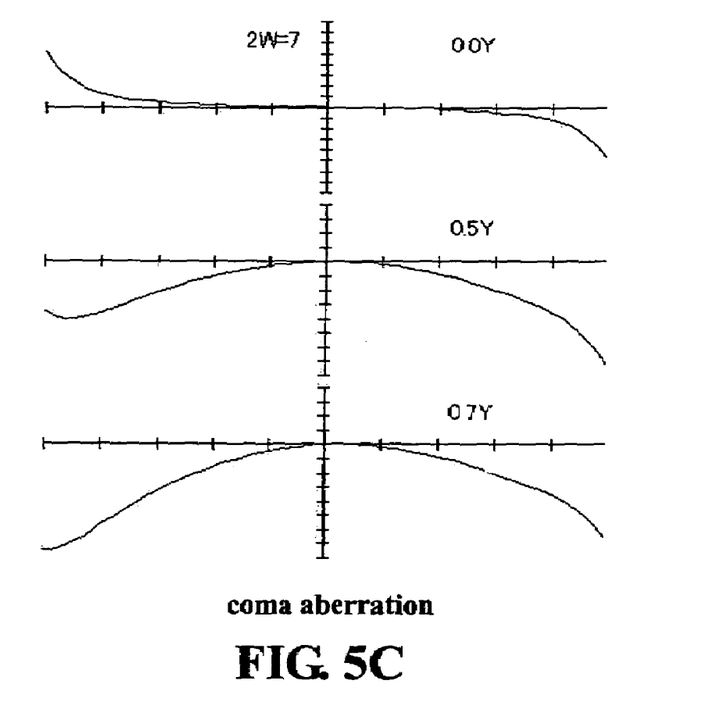
Figure 6A:
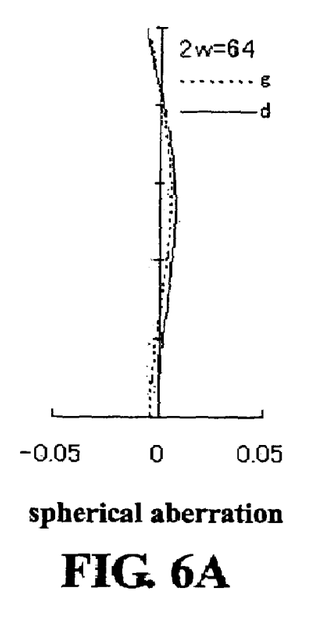
FIGS. 6A to 6D illustrates aberration curve diagrams of spherical aberration, distortion aberration, astigmatic aberration, and chromatic difference of magnification when a zoom lens is in a wide status in accordance with numerals of second embodiment according to the present invention.
Figure 6B:
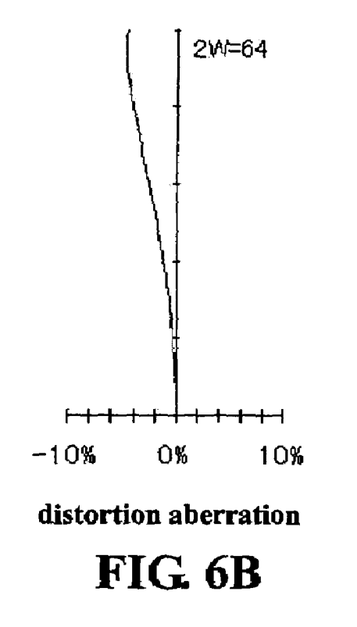
Figure 6C:
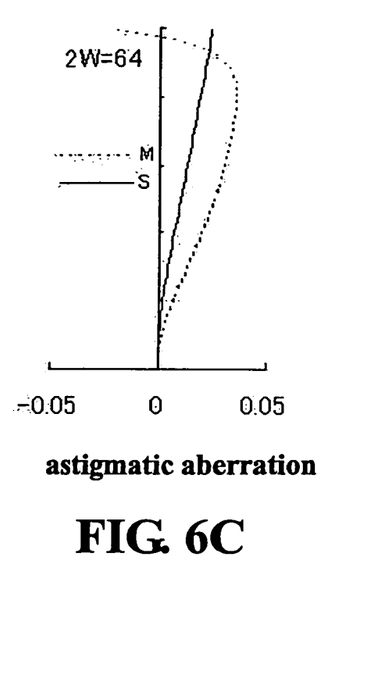
Figure 6D:
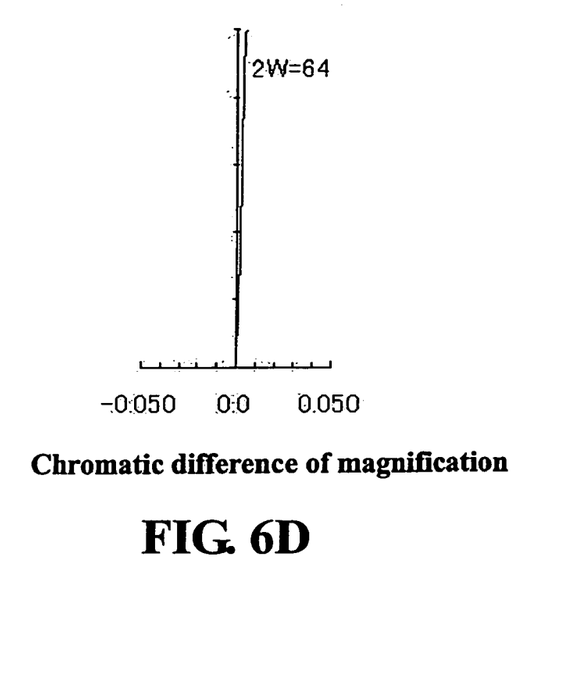
Figure 7A:
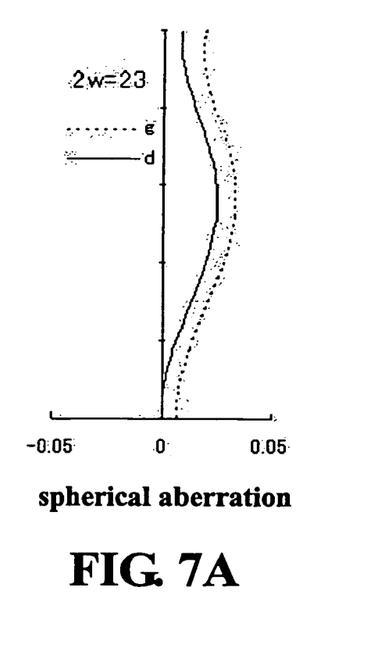
FIGS. 7A to 7D illustrates aberration curve diagrams of spherical aberration, distortion aberration, astigmatic aberration, and chromatic difference of magnification when a zoom lens is in a status between the wide status and a telephoto status in accordance with numerals of second embodiment according to the present invention.
Figure 7B:
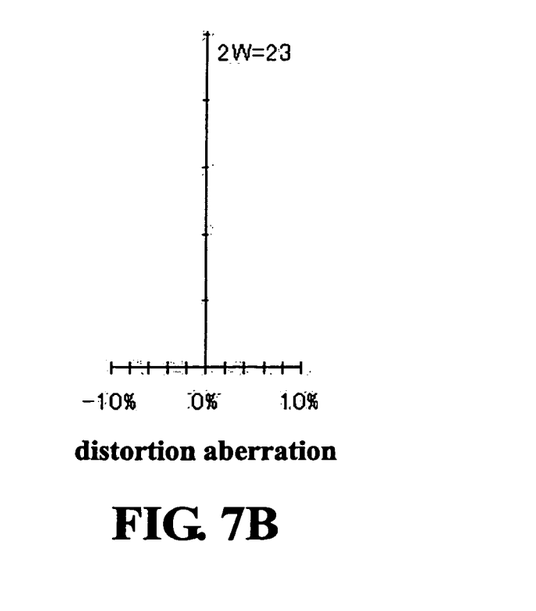
Figure 7C:
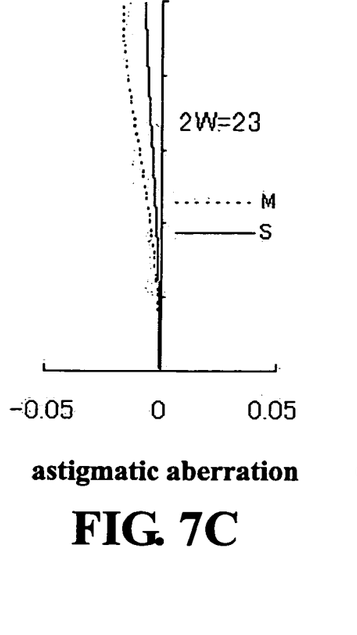
Figure 7D:
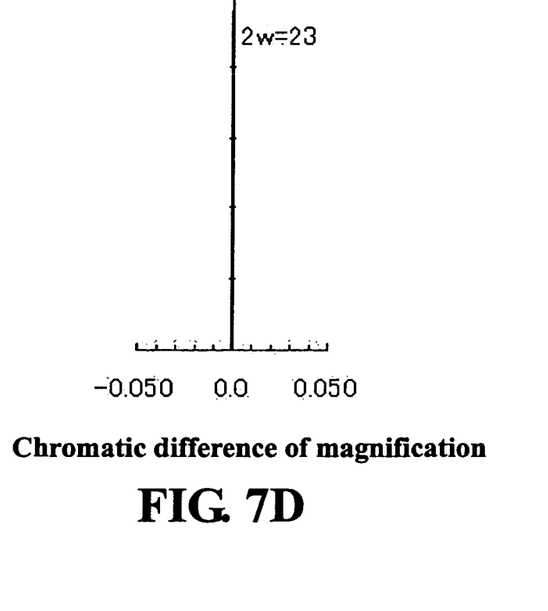
Figure 8A:
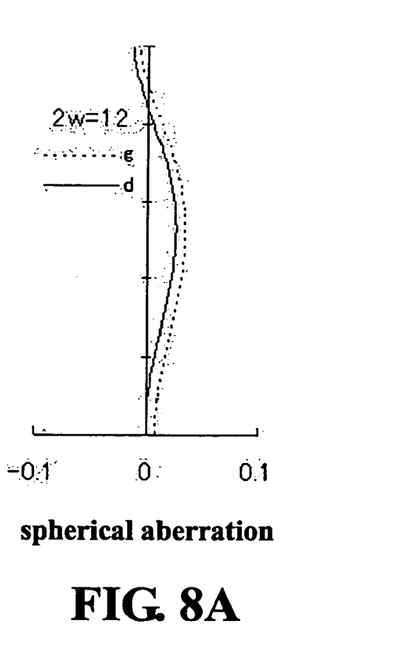
FIGS. 8A to 8D illustrates aberration curve diagrams of spherical aberration, distortion aberration, astigmatic aberration, and chromatic difference of magnification when a zoom lens is in a telephoto status in accordance with numerals of second embodiment according to the present invention.
Figure 8B:
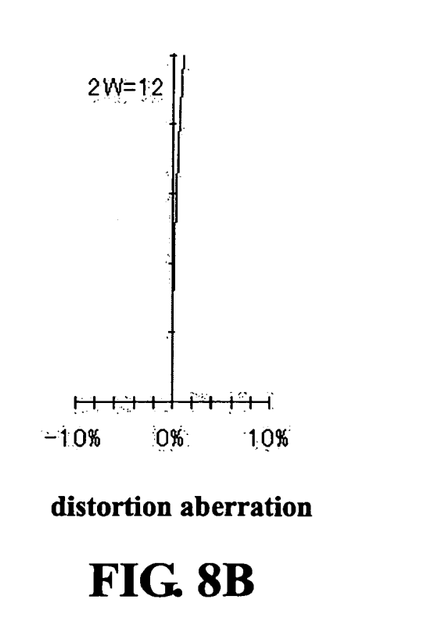
Figure 8C:
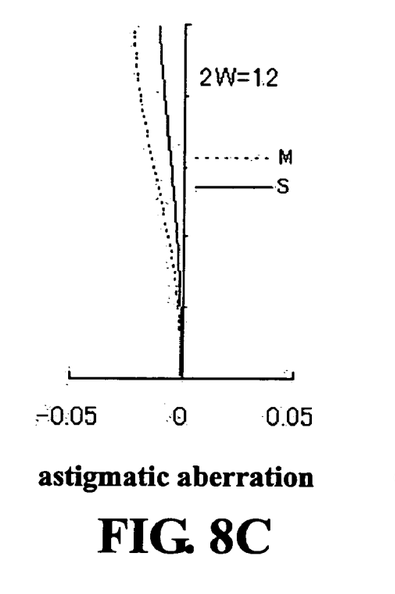
Figure 8D:
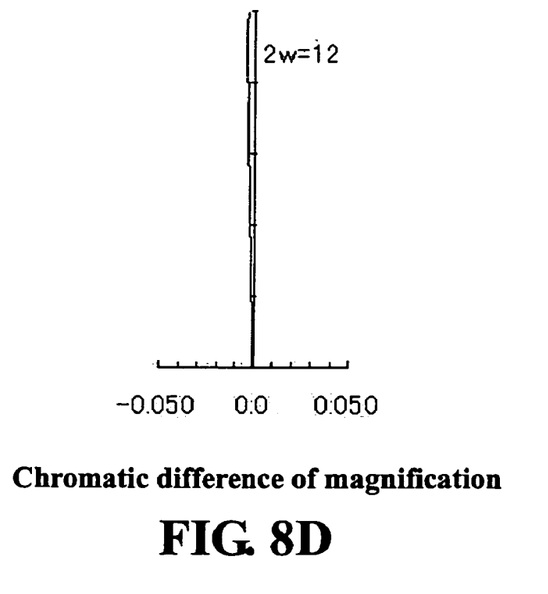
Figure 9A:
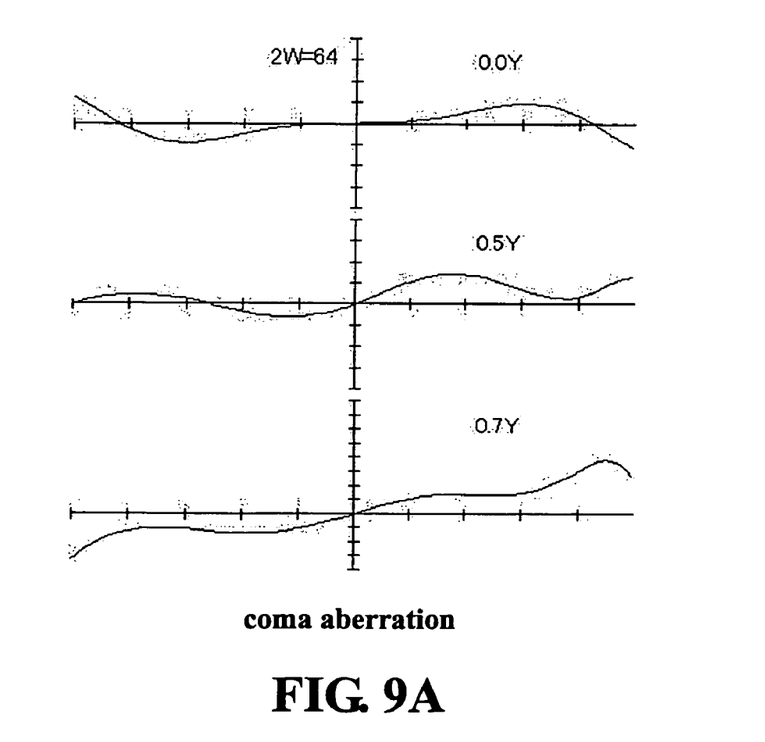
FIGS. 9A to 9C illustrates aberration curve diagrams of coma aberrations when a zoom lens is in the wide status, the in-between status, and the telephoto status in accordance with numerals of second embodiment according to the present invention.
Figure 9B:
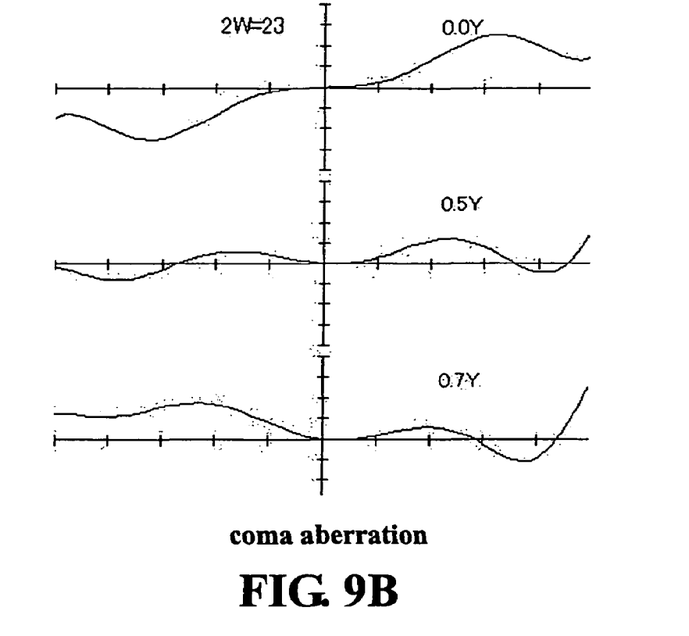
Figure 9C:
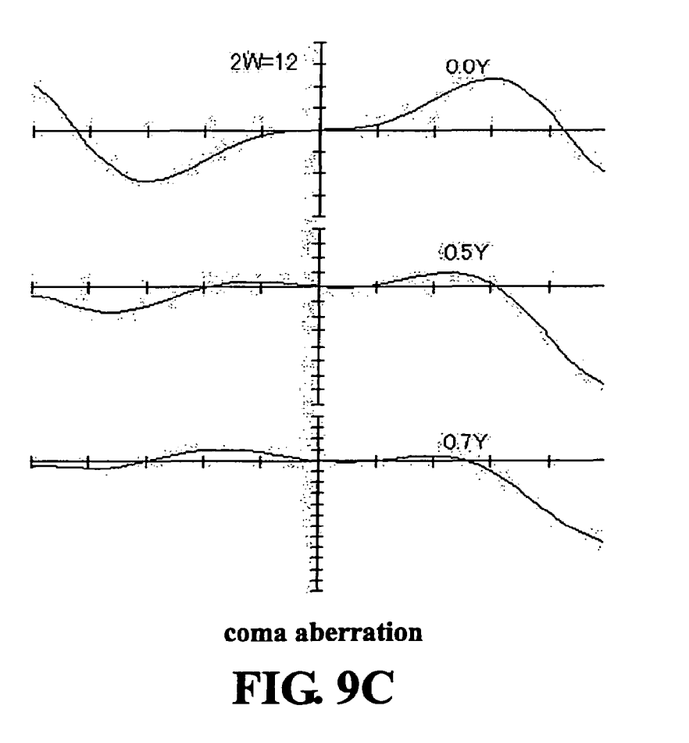

Please refer to FIG. 1. It shows an optical structural diagram of a zoom lens according to the present invention. The zoom lens comprises five lens groups, which are first lens group 1 with positive power, second lens group 2 with negative power, third lens group 3 with positive power, fourth lens group 4 with positive power, and fifth lens group 5 with positive power in order from the object side to the image side. The first lens group 1 comprises a compound lens 10 constituted by a first optical lens 101 and a second optical lens 102, and a single second lens 11. The first lenses group 1 can be molded with plastics or glass. The first lens group 1 is fixed at a forefront of the zoom lens to face the object side for receiving light. In the embodiment illustrated, first surfaces of the compound lens 10 and the single second lens 11, facing the object side, are convex, second surfaces at the opposite sides are concave so that the zoom lens of the present invention has appropriate visual angle when the zoom lens is in a wide status.

The second lens group 2 is employed to change the focal length of the zoom lens. The second lens group 2 comprises a first lens 21 with negative power, a second lens 22 with negative power, and a third lens 23 with positive power. The second lens group 1 can also be molded with plastics or glass. The first lens 21 of the second lens group 2 is a biconcave lens, whose radius of curvature of the first surface facing the object side is large. The first surface approximates a plane. The radius of curvature of the second surface facing the image side is small. The second surface is of deep concavity. The first surface of the second lens 22 of the second lens group 2, facing the object side is convex; the second surface at the opposite side is of deep concavity. The third lens 23 is a single convex lens. The first surface of the third lens 23, facing the object side is convex. The second lens 22 and the third lens 23 of the second lens group 2 are combined into a compound lens. Furthermore, at least one among the first lens 21, the second lens 22, and the third lens 23 of the second lenses group 2 is an aspherical lens.

The sensitivity of the zoom lens according to the present invention is specifically determined by the second lens group 2, which is precisely adjusted during the manufacture of the zoom lens to simplify the adjusting and proofing procedures of other lens groups.

The third lens group 3 of the zoom lens according to the present invention is fixedly positioned. The third lens group 3 is a compound lens jointing a convex lens 31 and a concave lens 32. Furthermore, the zoom lens further comprises a coating (not shown) at one side of the third lenses group 3 to control the amount of incident light.

The fourth lens group 4 of the zoom lens according to the present invention is a compensation system to the zoom lens for compensating the position variation of the image side 6 caused by zoom actions of the zoom lens. The compensation provided by the fourth lens group 4 can ensure the position of the image side 6 always the same. The incident light can be focused on the image side 6 at the same position to obtain a distinct image of the incident light. The fourth lens group 4 comprises a first positive lens 41, a second positive lens 42, and a negative lens 43 in order from the object side to the image side. The first positive lens 41 can be a biconvex lens. The second positive lens 42 can be a biconvex lens, too. The negative lens 43 can be a biconcave lens, meanwhile, the negative lens 43 and the second positive lens 42 can be jointed as a compound lens. Furthermore, at least one among the first positive lens 41, the second positive lens 42, and the negative lens 43 of the third lenses group 3 is an aspherical lens to improve the image aberration and the astigmatic aberration and obtain a good resolution for the zoom lens of the present invention. Such as that shown in a preferred embodiment, the first surface of the first positive lens 41, facing the object side can be aspherical.

Moreover, the fifth lens group 5 can be a single convex lens with positive power. When the zoom lens proceeds for focusing, the fifth lens group 5 will be moved toward the object side, approaching the fourth lens group 4 to decrease the interval between the fourth lens group 4 and the fifth lens group 5. The fifth lens group 5 can also be a portion of the compensation system concurrently. The fifth lens group 5 will be moved alone for the focusing after being moved with the second lens group 2 and the fourth lens group 4 simultaneously to complete the zooming.

The zoom lens of the present invention proceeds for zooming by changing the interval between the second lens group 2, the fourth lens group 4 and the third lens group 3, i.e. the second lens group 2 is moved toward the third lens group 3; the interval between the first lens group 1 and the second lens group 2 gets increased; the fourth lens group 4 is moved toward the third lens group 3; the interval between the third lens group 3 and the fourth lens group 4 gets decreased when the zoom lens is zoomed from a wide status to a telephoto status. After the zooming, the position of the fifth lens group 5 is adjusted for the focusing to obtain a distinct image.

Although, the zoom lens of the present invention comprises five lens groups, the total number of the lens is less than those disclosed in the prior arts, resulting in a compact structure. Meanwhile, an internal zooming concept is employed for the zoom lens of the present invention. Therefore, the total length of the zoom lens keeps the same. The zoom lens satisfies an equation as follows:

$$0.75 \leq \frac{2 \cdot f_W \cdot f_T}{Y \cdot L} \leq 1.35 \quad (a-1)$$

In equation a-1, the parameter $f_W$ is the focal length when the zoom lens is zoomed in a wide status, the parameter $f_T$ is the focal length when the zoom lens is zoomed in a telephoto status, Y is a maximum image height, L is a total length of the zoom lens from the first surface of the first optical lens closest to the object side to the image side.

Moreover, the second lens group 2 and fourth lens group 4 satisfy an equation as follows:

$$2.3 \leq \left|\frac{f_4}{f_2}\right| \leq 3.9 \quad (a-2)$$

In equation a-2, the parameter $f_2$ is a focal length of the second lens group 2 and the parameter $f_4$ is a focal length of the fourth lens group 4.

If a spherical lens is employed, it is necessary to have an interval long enough for positioning the compound lens to rectify the aberrations of the zooming. Therefore, the second lens group 2 and the fourth lens group 4 comprise at least one aspherical lens respectively to provide the zoom lens with a better aberration rectification. The aspherical surfaces can be expressed as follows:

$$D = \frac{C \cdot H^2}{1 + \sqrt{1 - (1+K) \cdot C^2 \cdot H^2}} + E_4 \cdot H^4 + E_6 \cdot H^6 + E_8 \cdot H^8 + E_{10} \cdot H^{10}$$

The parameter D is displacement of the optical axis from the apex of the surface to a position with a height H vertically. The parameter K is a conic constant. The parameter C is equal to 1/R, and R is a radius of curvature. The parameters $E_4$, $E_6$, $E_8$, and $E_{10}$ are high-grade aspherical coefficients.

The present invention can be implemented in accordance with the data of the first embodiment listed below according to the present invention.

The data of first embodiment:

|     | R       | D      | Glass  |
| --- | ------- | ------ | ------ |
| 1   | 9.532   | 0.204  | FD4    |
| 2   | 4.092   | 0.848  | LAC14  |
| 3   | 51.746  | 0.025  |        |
| 4   | 4.793   | 0.548  | LAC14  |
| 5   | 12.705  | D1     |        |
| 6   | −29.608 | 0.132  | BACD5  |
| 7   | 0.938   | 0.695  |        |
| 8   | −8.802  | 0.119  | BACD5  |
| 9   | 1.422   | 0.424  | FD110  |
| 10  | 16.002  | 0.0050 | HB     |
| 11  | 3.383   | D2     |        |
| STO | ∞       | 0.102  |        |
| 13  | 2.767   | 0.339  | BACD5  |
| 14  | −1.357  | 0.119  | BAFD7  |
| 15  | −7.846  | D3     |        |
| 16  | 4.982   | 0.005  | HB     |
| 17  | 5.177   | 0.373  | BACD16 |
| 18  | −3.995  | 0.036  |        |
| 19  | 1.359   | 0.390  | LAC7   |
| 20  | 336.400 | 0.119  | FD5    |
| 21  | 0.953   | D4     |        |
| 22  | −17.554 | 0.305  | FC5    |
| 23  | −2.492  | 0.104  |        |
| 24  | ∞       | 0.170  | BSC7   |
| 25  | ∞       |        |        |

Each value of the aspherical surface:

| Surface number | K | E4 | E6 | E8 | E10 |
|---|---|---|---|---|---|
| 6 | 0 | −6.49387E−03 | 1.26541E−02 | −5.49496E−03 | 9.77630E−04 |
| 11 | 0 | −6.16536E−02 | −2.16113E−02 | −4.76662E−03 | −2.38882E−02 |
| 16 | 0 | −1.46421E−02 | −7.99711E−03 | −1.55952E−03 | 1.17097E−02 |

| Status of zoom lens (focal length) | D1 | D2 | D3 | D4 |
|---|---|---|---|---|
| W (f = 1.0) | 0.3060 | 4.0967 | 1.7992 | 1.5444 |
| M (f = 4.4) | 2.6370 | 1.3752 | 0.1945 | 3.1478 |
| T (f = 10) | 3.8624 | 0.5093 | 0.1657 | 3.1857 |

In the zoom lens implemented in accordance with the data of first embodiment according to the present invention, the first lens 21 of the second lens group 2 is a single-surface aspherical lens. The first surface of the first lens 21 is aspherical. The third lens 23 is also a single-surface aspherical lens. The surface of the third lens 23 facing the image side is aspherical. The positive lens 41 of the fourth lens group 4 is also a single-surface aspherical lens. FIG. 2A to FIG. 5C are the aberration curve diagrams when the zoom lens is in different statuses in accordance with the data of the first embodiment that the zooming rate of the zoom lens is 10× according to the present invention.

The present invention can be implemented in accordance with data of the second embodiment listed below according to the present invention.

The data of second embodiment:

| | R | D | Glass |
|---|---|---|---|
| 1 | 8.885 | 0.204 | FD4 |
| 2 | 3.649 | 0.848 | LAC8 |
| 3 | 35.629 | 0.025 | |
| 4 | 3.849 | 0.500 | LAC14 |
| 5 | 11.405 | D1 | |
| 6 | 382.041 | 0.132 | BACD5 |
| 7 | 0.990 | 0.578 | |
| 8 | −10.493 | 0.119 | BACD5 |
| 9 | 1.504 | 0.424 | FD110 |
| 10 | 4.542 | 0.005 | HB |
| 11 | 3.211 | D2 | |
| STO | ∞ | 0.102 | |
| 13 | 2.015 | 0.339 | BACD5 |
| 14 | −1.229 | 0.119 | BAFD7 |
| 15 | −9.627 | D3 | |
| 16 | 3.284 | 0.005 | HB |
| 17 | 3.998 | 0.373 | LAC7 |
| 18 | −3.330 | 0.030 | |
| 19 | 1.365 | 0.390 | LAC7 |
| 20 | 21.050 | 0.119 | FD5 |
| 21 | 0.891 | D4 | |
| 22 | 18.038 | 0.305 | FC5 |
| 23 | −2.114 | 0.082 | |
| 24 | ∞ | 0.170 | BSC7 |
| 25 | ∞ | | |

Each value of the aspherical surface:

| Surface number | K | E4 | E6 | E8 | E10 |
|---|---|---|---|---|---|
| 6 | 0 | −1.70167E−02 | 1.08985E−02 | −5.64082E−03 | 2.62764E−03 |
| 11 | 0 | −8.47535E−02 | −3.70359E−02 | 2.05815E−02 | 2.56339E−02 |
| 16 | 0 | −8.86099E−02 | 1.85814E−01 | −4.15798E−01 | 3.14237E−01 |

| Status of zoom lens (focal length) | D1 | D2 | D3 | D4 |
|---|---|---|---|---|
| W (f = 1.0) | 0.400 | 2.400 | 1.186 | 1.005 |
| M (f = 3.0) | 1.881 | 0.886 | 0.352 | 1.797 |
| T (f = 6.0) | 2.740 | 0.243 | 0.191 | 1.955 |

In the zoom lens implemented in accordance with the data of the second embodiment according to the present invention, the first lens 21 of the second lens group 2 is a single-surface aspherical lens. The first surface of the first lens 21 is aspherical. The third lens 23 is also a single-surface aspherical lens. The surface of the third lens 23 facing the image side is aspherical. The positive lens 41 of the fourth lens group 4 is also a single-surface aspherical lens. FIG. 6A to FIG. 9C are the aberration curve diagrams when the zoom lens is in different statuses in accordance with numerals of the second embodiment that the zooming rate of the zoom lens is 6× according to the present invention.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A zoom lens, comprising:
   a first lens group with positive power, fixed at a forefront of the zoom lens to face an object side for receiving light;
   a second lens group with negative power, movably positioned behind the first lens group for zooming, and comprising a first lens, a second lens with negative power, a third lens with positive power, wherein the first lens is a biconcave lens, at least one of the lenses of the second lens group comprising one aspherical lens;
   a third lens group with positive power, fixedly positioned behind the second lens group;
   a fourth lens group with positive power, movably positioned behind the third lens group, and comprising at least one aspherical lens; and
   a fifth lens group with positive power, movably positioned behind the fourth lens group for focusing,
   wherein when the zoom lens is zoomed from a wide status to a telephoto status, an interval between the first lens group and the second lens group is increased, an interval between the third lens group and the fourth lens group is decreased.

2. The zoom lens of claim 1, wherein the first lens group comprises a compound lens constituted by a first optical lens and a second optical lens, and a single second lens.

3. The zoom lens of claim 2, wherein first surfaces of the lenses of first lens group, facing the object side, are convex, second surfaces of the lenses of the first lens group, facing the image side, are concave.

4. The zoom lens of claim 1, wherein the second lens of the second lens group is a biconcave lens, having a first surface facing the object side is of shallow concavity, and a second surface facing the image side is of deep concavity.

5. The zoom lens of claim 4, wherein a third lens of the second lens group is a convex lens, having a first surface facing the object side that is convex.

6. The zoom lens of claim 5, wherein the second lens and the third lens of the second lens group are combined into a compound lens.

7. The zoom lens of claim 6, wherein the first lens of the second lens group is an aspherical lens, having a first surface facing the object side that is aspherical.

8. The zoom lens of claim 7, wherein the third lens of the second lens group is an aspherical lens, having a second surface facing the image side that is aspherical.

9. The zoom lens of claim 1, wherein the third lens group is a compound lens jointing a convex lens and a concave lens.

10. The zoom lens of claim 1, wherein the fourth lens group comprises a first positive lens, a second positive lens, and a negative lens in order from the object side to the image side.

11. The zoom lens of claim 10, wherein the first positive lens is a biconvex lens, the second positive lens is a biconvex lens, and the negative lens is a biconcave lens.

12. The zoom lens of claim 10, wherein the negative lens and the second positive lens are jointed as a compound lens.

13. The zoom lens of claim 10, wherein a first surface of the first positive lens, facing the object side, is aspherical.

14. The zoom lens of claim 1, which satisfies the following equation:

$$0.75 \leq \frac{2 \cdot f_W \cdot f_T}{Y \cdot L} \leq 1.35$$

wherein the $f_W$ is the focal length when the zoom lens is zoomed in a wide status, the $f_T$ is the focal length when the zoom lens is zoomed in telephoto status, Y is a maximum image height, L is a total length of the zoom lens from a first surface of the first optical lens closest to the object side to the image side.

15. The zoom lens of claim 1, wherein the second and fourth lens groups satisfy the following equation:

$$2.3 \leq \left|\frac{f_4}{f_2}\right| \leq 3.9$$

wherein $f_2$ is a focal length of the second lens group, and $f_4$ is a focal length of the fourth lens group.

* * * * *